United States Patent
Suzuki et al.

(10) Patent No.: US 10,911,936 B2
(45) Date of Patent: Feb. 2, 2021

(54) SCEF ENTITY, COMMUNICATION TERMINAL, DATA PROCESSING METHOD, DATA RECEIVING METHOD, AND NON-TRANSITORY COMPUTER READABLE MEDIUM

(71) Applicant: NEC Corporation, Tokyo (JP)

(72) Inventors: Naoaki Suzuki, Tokyo (JP); Norio Uchida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 19 days.

(21) Appl. No.: 16/339,808

(22) PCT Filed: Oct. 5, 2017

(86) PCT No.: PCT/JP2017/036380
§ 371 (c)(1),
(2) Date: Apr. 5, 2019

(87) PCT Pub. No.: WO2018/066668
PCT Pub. Date: Apr. 12, 2018

(65) Prior Publication Data
US 2019/0230492 A1 Jul. 25, 2019

(30) Foreign Application Priority Data

Oct. 7, 2016 (JP) .................. 2016-199093

(51) Int. Cl.
*H04W 8/08* (2009.01)
*H04W 4/20* (2018.01)
(Continued)

(52) U.S. Cl.
CPC ............... *H04W 8/08* (2013.01); *H04W 4/20* (2013.01); *H04W 8/26* (2013.01); *H04W 12/06* (2013.01);
(Continued)

(58) Field of Classification Search
CPC ......... H04W 8/08; H04W 92/14; H04W 4/20; H04W 28/14; H04W 92/24; H04W 12/06; H04W 88/18; H04W 8/26; H04W 40/005
See application file for complete search history.

(56) References Cited

U.S. PATENT DOCUMENTS

| 2006/0285526 A1 | 12/2006 | Jang et al. |
| 2014/0003313 A1 | 1/2014 | Jain et al. |

(Continued)

FOREIGN PATENT DOCUMENTS

| JP | 2004-165791 A | 6/2004 |
| JP | 2009-010628 A | 1/2009 |
| JP | 2015-523028 A | 8/2015 |

OTHER PUBLICATIONS

Ericsson, "HLCOM for NIDD via SCEF", 3GPP Draft, Apr. 11-15, 2016, S2-161563, SA WG2 Meeting #114, pp. 1-3.

(Continued)

*Primary Examiner* — Brian T O Connor
(74) *Attorney, Agent, or Firm* — Sughrue Mion, PLLC

(57) ABSTRACT

To provide an SCEF entity capable of suppressing an increase in processing load related to communication between an SCEF and an MME in Non-IP data communication. An SCEF entity (10) according to the present invention includes a storage unit (11) configured to buffer first Non-IP data not delivered to a communication terminal (40), and a control unit (12) configured to, when the first Non-IP data is buffered upon receiving second Non-IP data addressed to the communication terminal (40) from a server device (30), suppress transmission of the second Non-IP data to a control device (20) in a mobile network and buffer the second Non-IP data into the storage unit (11).

4 Claims, 10 Drawing Sheets

(51) Int. Cl.

| | | |
|---|---|---|
| *H04W 28/14* | (2009.01) | |
| *H04W 92/24* | (2009.01) | |
| *H04W 12/06* | (2009.01) | |
| *H04W 88/18* | (2009.01) | |
| *H04W 8/26* | (2009.01) | |
| *H04W 92/14* | (2009.01) | |
| *H04W 40/00* | (2009.01) | |

(52) U.S. Cl.
CPC ........... *H04W 28/14* (2013.01); *H04W 88/18* (2013.01); *H04W 92/14* (2013.01); *H04W 92/24* (2013.01); *H04W 40/005* (2013.01)

(56) References Cited

U.S. PATENT DOCUMENTS

| | | | |
|---|---|---|---|
| 2018/0212710 A1* | 7/2018 | Ronneke | H04W 28/02 |
| 2019/0069211 A1* | 2/2019 | Ronneke | H04W 76/28 |
| 2019/0159077 A1* | 5/2019 | Ryu | H04W 36/0033 |

OTHER PUBLICATIONS

Nokia et al., "Group based message delivery via MME for CIoT devices", 3GPP Draft, Aug. 29-Sep. 2, 2016, S2-164792, SA WG2 Meeting #116bis, total 5 pages.

Convida Wireless et al., "SCEF Behavior in the Mobile Terminated NIDD Procedure", 3GPP Draft, 3GPP TSG-SA Meeting #76, Jun. 7-9, 2017, SP-170464 (revision of S2-173582), total 7 pages.

Communication dated May 29, 2019 from European Patent Office in counterpart EP Application No. 17858504.8.

3GPP TS 23.682, V14.1.0 (Sep. 2016), Technical Specification, 3rd Generation Partnership Project; Techincal Specification Group Services and System Aspects; Architecture enhancements to facilitate communications with packet data networks and applications (Release 14), Sep. 2016, pp. 1-99.

Alcatel-Lucent et al., "HLCOM Solution based on DL buffering in SGW," SA WG2 Meeting #106, S2-144597, Nov. 17-21, 2014, pp. 1-5.

Ericsson et al., "HLCOM and eDRX for NIDD via SCEF," SA WG2 Meeting #114, S2-161935, Apr. 11-15, 2016, pp. 1-10.

NEC, "Corrections for MT NIDD procedure to handle multiple non-IP data," SA WG2 Meeting #S2-117, S2-165760, Oct. 17-21, 2016, pp. 1-5.

Nokia et al., "Corrections for MT NIDD procedure to handle multiple non-IP data," SA WG2 Meeting #S2-118, S2-166631, Nov. 14-18, 2016, pp. 1-5.

3GPP TS 23.682, V14.2.0 (Dec. 2016), Technical Specification, 3rd Generation Partnership Project; Technical Specification Group Services and System Aspects; Architecture enhancements to facilitate communications with packet data networks and applications (Release 14), Dec. 2016, pp. 1-104.

International Search Report of PCT/JP2017/036380 dated Dec. 19, 2017.

* cited by examiner

Fig. 8

| ORDER OF BUFFERING | SETTING OF Non-IP DATA | ATTRIBUTE ID |
|---|---|---|
| 3 | YYY | yy |
| 2 | TURN ON | LAMP STATE |
| 1 | XXX | xx |

Fig. 9

| ORDER OF BUFFERING | SETTING OF Non-IP DATA | ATTRIBUTE ID |
|---|---|---|
| 3 | TURN OFF | LAMP STATE |
| 2 | YYY | yy |
| ~~2~~ | ~~TURN ON~~ | ~~LAMP STATE~~ |
| 1 | XXX | xx |

SCEF ENTITY, COMMUNICATION TERMINAL, DATA PROCESSING METHOD, DATA RECEIVING METHOD, AND NON-TRANSITORY COMPUTER READABLE MEDIUM

CROSS REFERENCE TO RELATED APPLICATIONS

This application is a National Stage of International Application No. PCT/JP2017/036380 filed Oct. 5, 2017, claiming priority based on Japanese Patent Application No. 2016-199093 filed Oct. 7, 2016, the disclosures of which are incorporated herein in their entirety by reference.

TECHNICAL FIELD

The present invention relates to an SCEF (Service Capability Exposure Function) entity, a communication terminal, a data processing method, a data receiving method and a program and, for example, relates to an SCEF entity, a communication terminal, a data processing method, a data receiving method and a program for processing Non-IP data.

BACKGROUND ART

Mobile communication technology related to IoT (Internet of Things) that allows various devices (things) to have mobile communication functions to enable connection to the Internet or communication with another device is expanding today. One issue to be addressed when allowing devices to have mobile communication functions is reduction of power consumption. Sensor devices or the like are expected to operate without maintenance over a long period of time, such as several years. Thus, it is desirable to reduce power consumption of communication when allowing such devices to have mobile communication functions.

Non-IP data delivery that performs data communication without using the IP protocol stack is defined as one of the techniques to reduce power consumption of communication by 3GPP (3rd Generation Partnership Project) that defines the standard for mobile communication.

Non Patent Literature 1 discloses, in Section 5.13.3, a configuration example for carrying out downlink (from network to terminal) Non-IP data delivery in an EPC (Evolved Packet Core) network and a procedure in this configuration example.

This configuration example includes a UE (User Equipment) that receives Non-IP data, an SCS (Services Capability Server) or an AS (Application Server), which is a sender of Non-IP data, an SCEF (Service Capability Exposure Function) that receives Non-IP data and carries out authorization, traffic quota control and rate control (load control), and an MME (Mobility Management Entity) that transmits Non-IP data to a UE by using a C (Control)-Plane message (e.g., NAS (Non Access Stratum) message).

CITATION LIST

Non Patent Literature

NPL1: 3GPP TS 23.682 V14.1.0 (2016-09) Section 5.13.3

SUMMARY OF INVENTION

Technical Problem

In mobile communication, there is a case where a UE is temporarily unreachable in downlink (from network to terminal) communication due to power saving mode, reception conditions or the like of the UE. According to the procedure for downlink (from network to terminal) Non-IP data delivery in Section 5.13.3 of Non Patent Literature 1, when a UE is unreachable in downlink communication, Non-IP data delivery is carried out after the UE becomes reachable.

The MME receives a request for Non-IP data delivery (NIDD Submit Request) from the SCEF. When the MME detects that a UE is unreachable, it returns a response (NIDD Submit Response) to the NIDD Submit Request, which contains Cause indicating that Non-IP data has not been delivered to the UE. Cause set to the NIDD Submit Request further indicates that, when the MME detects that a UE has become reachable, the MME gives a notification (NIDD Submit Indication) to the SCEF.

Receiving the above-described response (NIDD Submit Response), the SCEF buffers Non-IP data until the NIDD Submit Indication is transmitted from the MME. The SCEF eventually re-transmits the NIDD Submit Request upon receiving the NIDD Submit Indication from the MME.

However, the following problem occurs when two or more NIDD Submit Requests are made from the SCS or the AS to the UE while this UE is unreachable.

There is a case where, while the SCEF buffers first Non-IP data, the SCEF receives an NIDD Submit Request related to second Non-IP data from the SCS or the AS due to the reason that a UE is unreachable. In this case, the SCEF transmits the NIDD Submit Request related to the second Non-IP data to the MME. Because the UE is currently unreachable, the second Non-IP data does not reach the UE and is buffered in the SCEF, just like the first Non-IP data. Thus, transmitting an NIDD Submit Request related to second Non-IP data from the SCEF under the situation where a UE is unreachable has the adverse effect of unnecessarily increasing communication processing between the SCEF and the MME.

An object of the present disclosure is to provide an SCEF entity, a communication terminal, a data processing method, a data receiving method and a program capable of suppressing an increase in processing load for communication between an SCEF and an MME in Non-IP data delivery.

Solution to Problem

An SCEF entity according to a first aspect of the present invention includes a storage unit configured to buffer first Non-IP data not delivered to a communication terminal, and a control unit configured to, when the first Non-IP data is buffered upon receiving second Non-IP data addressed to the communication terminal from a server device, suppress transmission of the second Non-IP data to a control device in a mobile network and buffer the second Non-IP data into the storage unit.

A communication terminal according to a second aspect of the present invention includes a communication unit configured to, upon the communication terminal becoming reachable, receive a plurality of Non-IP data buffered in an SCEF entity until the communication terminal becomes reachable as one message through a control device, and a control unit configured to read the plurality of Non-IP data contained in the one message for each Non-IP data.

A data processing method according to a third aspect of the present invention includes buffering first Non-IP data not delivered to a communication terminal, and when the first Non-IP data is buffered upon receiving second Non-IP data addressed to the communication terminal from a server device, suppressing transmission of the second Non-IP data to a control device in a mobile network and buffering the second Non-IP data into the storage unit.

A data communication method according to a fourth aspect of the present invention includes, upon a communication terminal becoming reachable, receiving a plurality of Non-IP data buffered in an SCEF entity until the communication terminal becomes reachable as one message through a control device, and reading the plurality of Non-IP data contained in the one message for each Non-IP data.

A program according to a fifth aspect of the present invention causes a computer to execute buffering first Non-IP data not delivered to a communication terminal, and when the first Non-IP data is buffered upon receiving second Non-IP data addressed to the communication terminal from a server device, suppressing transmission of the second Non-IP data to a control device in a mobile network and buffering the second Non-IP data into the storage unit.

Advantageous Effects of Invention

According to the present invention, it is possible to provide an SCEF entity, a communication terminal, a data processing method, a data receiving method and a program capable of suppressing an increase in processing load for communication between an SCEF and an MME in Non-IP data delivery.

BRIEF DESCRIPTION OF DRAWINGS

FIG. 8 is a view showing Non-IP data stored in a buffer according to a fifth embodiment.

FIG. 9 is a view showing Non-IP data stored in a buffer according to the fifth embodiment.

DESCRIPTION OF EMBODIMENTS

First Embodiment

Figure 1:
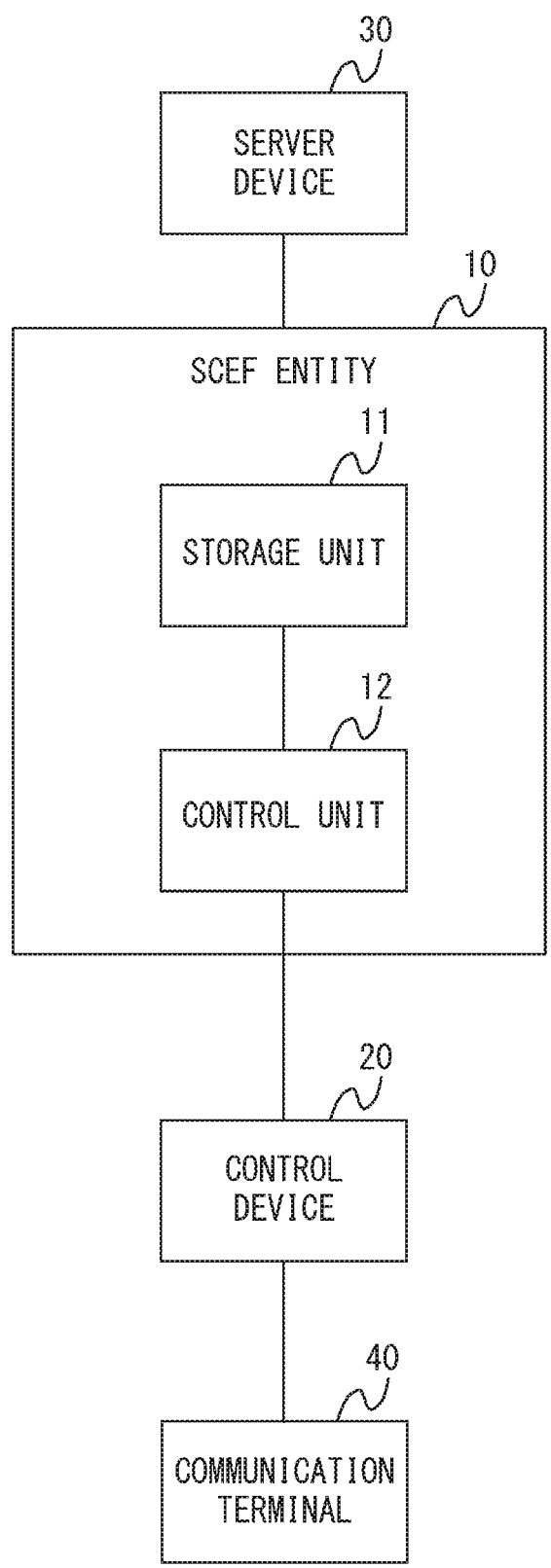
FIG. 1 is a block diagram of a communication system according to a first embodiment.

Embodiments of the present invention are described hereinafter with reference to the drawings. A configuration example of a communication system according to a first embodiment of the present invention is described with reference to FIG. 1. The communication system in FIG. 1 includes an SCEF (Service Capability Exposure Function) entity (which is referred to hereinafter as SCEF) 10, a control device 20, a server device 30, and a communication terminal 40. The SCEF 10, the control device 20, the server device 30 and the communication terminal 40 may be implemented by a computer device that operates by running, on a processor, a program stored in a memory.

The communication terminal 40 may be a mobile phone terminal, a smartphone terminal, a tablet terminal or the like. Alternatively, the communication terminal 40 may be an M2M (Machine to Machine) terminal, an MTC (Machine Type Communication) terminal, an IoT (Internet of Things) terminal or the like. The communication terminal 40 communicates with the SCEF entity 10 through a radio access network.

The server device 30 may be, for example, an application server that provides an application service. Alternatively, the server device 30 may be a server device that is placed between an application server and the SCEF 10 and relays data related to an application service.

The control device 20 is a node device that is placed in a mobile network. The control device 20 is a node device that relays or processes control information in the mobile network. The control information may be called, for example, C (Control)-Plane data, a C-Plane message or the like. The control device 20 may be, for example, an MME, an SGSN (Serving GPRS (General Packet Radio Service) Support Node) defined in 3GPP or the like.

The SCEF 10 is a node device whose operation is defined by 3GPP. The SCEF 10 is a mobile network defined by 3GPP, and it is placed between a mobile network managed by a mobile telecommunications carrier and a server device or the like, such as an application server, managed by a third party different from the mobile telecommunications carrier. The SCEF 10 securely provides, to the server device 30, information about a service available in a mobile network and capabilities enabling the service to be provided.

Further, the SCEF 10 delivers or distributes Non-IP data transmitted from the server device 30 to the communication terminal 40 through the control device 20 in the mobile network. In the following description, the term "delivery" may be replaced with "distribution". Non-IP data is data not using the IP protocol stack. Non-IP data is data where data packets to be used for communication are not structured in terms of EPS (Evolved Packet System). For example, technology that is collectively called LPWA (Low Power Wide Area), such as LoRa, SIGFOX, and NB-IoT does not establish an IP data bearer for the purpose of reducing power consumption of a device. To deal with this issue, a mechanism for exchanging low-volume data in C-plane (Non-IP Data Delivery (NIDD)) is defined in a 3GPP network. Non-IP data is transmitted as control information in a mobile network. Non-IP data may be data transmitted to, for example, an IoT terminal to receive an IoT service.

A configuration example of the SCEF 10 is described next. The SCEF 10 includes a storage unit 11 and a control unit 12. The control unit 12 may be software, a module or the like whose processing is executed by running, on a processor, a program stored in a memory. Alternatively, the control unit 12 may be hardware such as a chip or a circuit. The storage unit 11 may be a memory, for example.

The storage unit 11 buffers Non-IP data that has not been delivered to the communication terminal 40. In other words, the storage unit 11 temporarily stores, holds or retains Non-IP data until re-transmitting Non-IP data to the communication terminal 40. The case where Non-IP data is not delivered to the communication terminal 40 is when the communication terminal 40 is in power saving mode, when reception conditions become so worse that radio communication cannot be conducted or the like, for example. The state where Non-IP data is not delivered to the communication terminal 40 may be referred to as the state where the communication terminal 40 is unreachable. On the other hand, the state where Non-IP data can be delivered to the communication terminal 40 may be referred to as the state where the communication terminal 40 is reachable.

In the case where Non-IP data that has not been delivered to the communication terminal 40 is buffered in the storage unit 11 when receiving Non-IP data addressed to the communication terminal 40 from the server device 30, the control unit 12 suppresses transmission of the Non-IP data received from the server device 30 to the control device 20 in a mobile network and buffers the Non-IP data received from the server device 30 into the storage unit 11. Suppressing transmission of Non-IP data to the control device 20 in a mobile network includes not transmitting Non-IP data to the control device 20 in a mobile network.

The case where Non-IP data that has not been delivered to the communication terminal 40 is buffered in the storage unit 11 is when the communication terminal 40 is unreachable. Therefore, even if the SCEF 10 transmits, to the control device 20, new Non-IP data addressed to the communication terminal 40 received from the server device 30, the control device 20 is unable to transmit the Non-IP data to the communication terminal 40 or is likely to be unable to transmit the Non-IP data to the communication terminal 40.

In such a case, the control unit 12 does not transmit the Non-IP data received from the server device 30 to the control device 20 and buffers the Non-IP data into the storage unit 11, and it is thereby possible to prevent the occurrence of unnecessary traffic in the mobile network.

Second Embodiment

A configuration example of a communication system according to a second embodiment of the present invention is described hereinafter with reference to FIG. 2. The communication system in FIG. 2 includes an SCEF 10, an MME 22, an SGSN 24, a RAN (Radio Access Network) 26, an AS 32, an SCS 34, and an UE 42.

The MME 22 and the SGSN 24 correspond to the control device 20 in FIG. 1. The AS 32 and the SCS 34 correspond to the server device 30 in FIG. 2. The UE 42 corresponds to the communication terminal 40 in FIG. 1. The UE 42 is used as a general term for communication terminals in 3GPP.

The RAN 26 may be an eNB (evolved Node B) that supports LTE (Long Term Evolution) communication, for example, and it may be a NodeB that supports radio communication defined as so-called 3G communication in 3GPP and an RNC (Radio Network Controller) that controls the NodeB.

The MME 22 and the SGSN 24 may be referred to as a CPF (C-Plane Function) entity (which is referred to hereinafter as CPF). The MME 22 and the SGSN 24 are devices that mainly make mobility management of the UE 42, bearer setup request, bearer setup instruction, bearer deletion request or bearer deletion instruction.

The AS 32 and the SCS 34 are devices to be used for providing an application service to the UE 42. An application service may be referred to as an IoT service, for example. The AS 32 or the SCS 34 transmits Non-IP data to the SCEF 10. The AS 32 may directly transmit Non-IP data to the SCEF 10 without through the SCS 34. In the following description, the AS 32 or the SCS 34 is sometimes referred to as an AS 32/SCS 34 or an SCS 34/AS 32.

The SCEF 10 transmits the Non-IP data transmitted from the SCS 34/AS 32 to the MME 22 or the SGSN 24. The MME 22 or the SGSN 24 delivers the Non-IP data to the UE 42 through the RAN 26. When the UE 42 is unreachable, the MME 22 or the SGSN 24 transmits the Non-IP data back to the SCEF 10. The SCEF 10 buffers the Non-IP data that has not been delivered to the UE 42.

Figure 2:
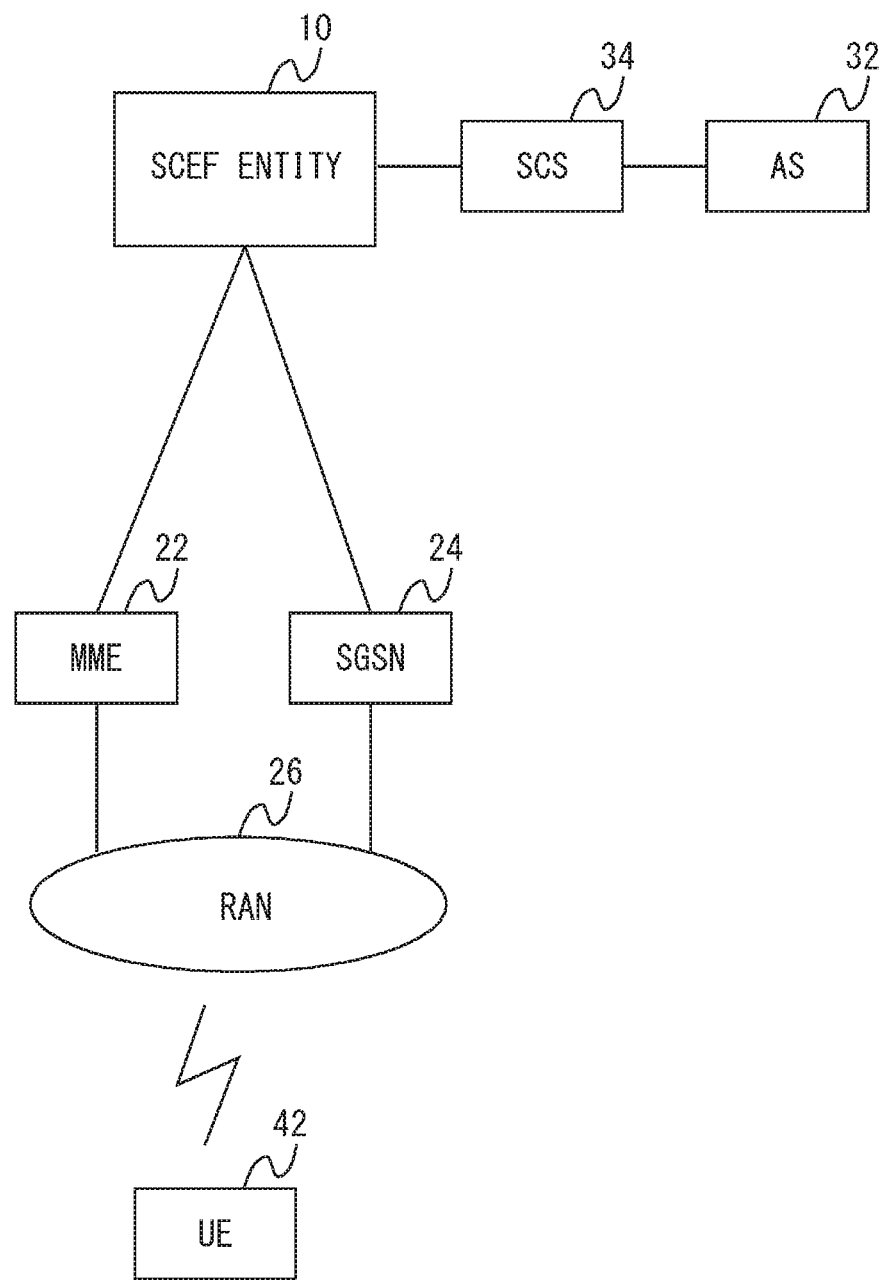
FIG. 2 is a block diagram of a communication system according to a second embodiment.

Further, FIG. 2 shows the configuration where the SCEF 10, the MME 22, the RAN 26 and the SGSN 24 belong to an HPLMN (Home Public Land Mobile Network). On the other hand, in the case where the SCEF 10 belongs to the HPLMN and the MME 22, the SGSN 24 and the RAN 26 belong to a VPLMN (Visited PLMN), IWK(Interworking)-SCEF may be placed between the SCEF 10 and the MME 22 and between the SCEF 10 and the SGSN 24. The IWK-SCEF is placed in the VPLMN and relays communication between the SCEF 10 and the MME 22 and between the SCEF 10 and the SGSN 24.

The flow of a process when the UE 42 is unreachable is described hereinafter with reference to FIG. 3. Although the process where the SCEF 10 delivers Non-IP data through the MME 22 is described in FIG. 3, the SGSN 24 may be used instead of the MME 22.

First, the SCS 34/AS 32 transmits an NIDD Submit Request message to the SCEF 10 (S11). The NIDD Submit Request message contains an External Identifier or an MSISDN (Mobile Subscriber Integrated Service Digital Network Number). Further, the NIDD Submit Request message contains an SCS/AS Reference ID and Non-IP data. The External Identifier and the MSISDN are identification information of the UE 42. The SCS/AS Reference ID is identification information of the SCS34 or the AS32.

When the SCEF 10 receives the NIDD Submit Request message from the SCS 34/AS 32, it checks whether there is SCEF EPS bearer context associated with the External Identifier or the MSISDN (S12). Further, when the SCEF 10 receives the NIDD Submit Request message from the SCS 34/AS 32, it checks whether the SCS 34/AS 32 is authorized to transmit an NIDD Submit Request message (S12). Furthermore, when the SCEF 10 receives the NIDD Submit Request message from the SCS 34/AS 32, it checks whether at least one of the allowed quota and rate of Non-IP data allowed for the SCS 34/AS 32 is exceeded or not (S12). The allowed quota may be a cumulative amount of data transmitted per day, for example.

The SCEF EPS bearer context is information indicating that a bearer for transmitting Non-IP data is established between the MME 22 and the SCEF 10. T6a is specified by 3GPP as a reference point between the MME 22 and the SCEF 10. A bearer between the MME 22 and the SCEF 10 is established during Attach processing of the UE 42. The SGSN 24 is used instead of the MME 22 in some cases. T6b is specified by 3GPP as a reference point between the SGSN 24 and the SCEF 10. An SCEF EPS bearer of the UE 42 is a bearer that is set up between the SCEF 10 and the MME 22 for transmitting Non-IP data between the UE 42 and the SCS 34/AS 32.

When at least one of the cases where there is no SCEF EPS bearer context, the SCS 34/AS 32 is not authorized to transmit an NIDD Submit Request message, and at least one of the allowed quota and rate of Non-IP data allowed for the SCS 34/AS 32 is exceeded applies, the SCEF 10 transmits an NIDD Submit Response message to the SCS 34/AS 32 (S13). Information that has caused transmission of the NIDD Submit Response message is set to the NIDD Submit Response message. The information that has caused transmission of the NIDD Submit Response message may be indicated using cause value set to the NIDD Submit Response message, for example.

When at least one of the allowed quota and rate of Non-IP data allowed for the SCS 34/AS 32 is exceeded, the SCEF 10 may discard the Non-IP data received in Step S11.

When the allowed quota of Non-IP data allowed for the SCS 34/AS 32 is exceeded, the SCEF 10 may discard the excess Non-IP data. When the allowed rate of Non-IP data allowed for the SCS 34/AS 32 is exceeded, the SCEF 10 may discard a part of the Non-IP data to fall within the allowed rate.

When there is no SCEF EPS bearer context associated with the External Identifier or the MSISDN, the SCEF 10 may perform processing for establishing Non-IP PDN connection with the MME that manages the UE corresponding to the External Identifier or the MSISDN.

Next, when there is SCEF EPS bearer context, the SCS 34/AS 32 is authorized to transmit an NIDD Submit Request message, and further the allowed quota and rate of Non-IP data allowed for the SCS 34/AS 32 is not exceeded, the control unit 12 of the SCEF 10 determines whether another Non-IP data to be transmitted to the SCEF EPS bearer of the UE 42 is already buffered in the storage unit 11 or not (S14). Another Non-IP data to be transmitted to the SCEF EPS bearer of the UE 42 may be Non-IP data that has not been delivered to the UE 42, for example.

When the control unit 12 of the SCEF 10 determines that another Non-IP data to be transmitted to the SCEF EPS bearer of the UE 42 is not buffered in the storage unit 11, the SCEF 10 transmits an NIDD Submit Request message to the MME 22 (S15). The NIDD Submit Request message contains User Identity, EPS (Evolved Packet System) Bearer ID, SCEF ID, Non-IP data, SCEF Wait Time, and Maximum Re-transmission time. The User Identity is identification information of the UE 42. The EPS bearer ID is identification information of a bearer (SCEF EPS bearer) set up between the SCEF 10 and the MME 22. The SCEF ID is identification information of the SCEF 10. The SCEF Wait Time is a time during which the SCEF 10 can wait for a Response message transmitted from the MME 22. The Maximum Re-transmission time is a time when the SCEF 10 can re-transmit a message.

The MME 22 receives the NIDD Submit Request message, and then detects that the UE 42 is unreachable (S16). The MME 22 then transmits an NIDD Submit Response message to the SCEF (S17). The NIDD Submit Response message contains Cause and Requested Re-transmission Time. The Cause indicates that Non-IP data is not delivered to the UE 42 because the UE 42 is in power saving mode and thus temporarily not reachable, and when the MME 22 detects that the UE has become reachable, the MME 22 gives a notification (NIDD Submit Indication) to the SCEF 10.

The Requested Re-transmission Time indicates a predicted time when the SCEF 10 will become able to re-transmit downlink data to the UE 42 that is currently unreachable.

Further, when the MME 22 detects that the UE has become reachable, the MME 22 sets a Not Reachable for NIDD flag indicating notification to the SCEF 10.

The SCEF 10 receives the NIDD Submit Response message from the MME 22, and then refers to Cause value indicating that the UE 42 is in power saving mode and thus temporarily not reachable, and thereby finds that the UE 42 is unreachable. Further, the SCEF 10 buffers the Non-IP data tried to be transmitted in Step S15 (S18). When, on the other hand, the SCEF 10 determines that another Non-IP data to be transmitted to the SCEF EPS bearer of the UE 42 is already buffered in the storage unit 11 in Step S14, it buffers the Non-IP data received in Step S11 without performing the processing of Steps S15 to S17 (S18).

Then, the SCEF 10 transmits an NIDD Submit Response message containing a result received from the MME 22 to the SCS 34/AS 32 (S19). Alternatively, the NIDD Submit Response message may contain information indicating that the SCEF 10 has buffered the Non-IP data received in Step S11 without transmitting it to the MME 22, or may contain information indicating that the UE 42 is in power saving mode and thus temporarily not reachable.

The flow of a process when the UE 42 is reachable is described hereinafter with reference to FIG. 4. First, the MME 22 detects that the UE 42 is reachable or about to become reachable (S21). For example, the MME 22 detects that the UE 42 is reachable when the UE 42 recovers from power saving mode by executing TAU (Tracking Area Update) or when Mobile Originated communication is started or the like, for example.

Figure 3:
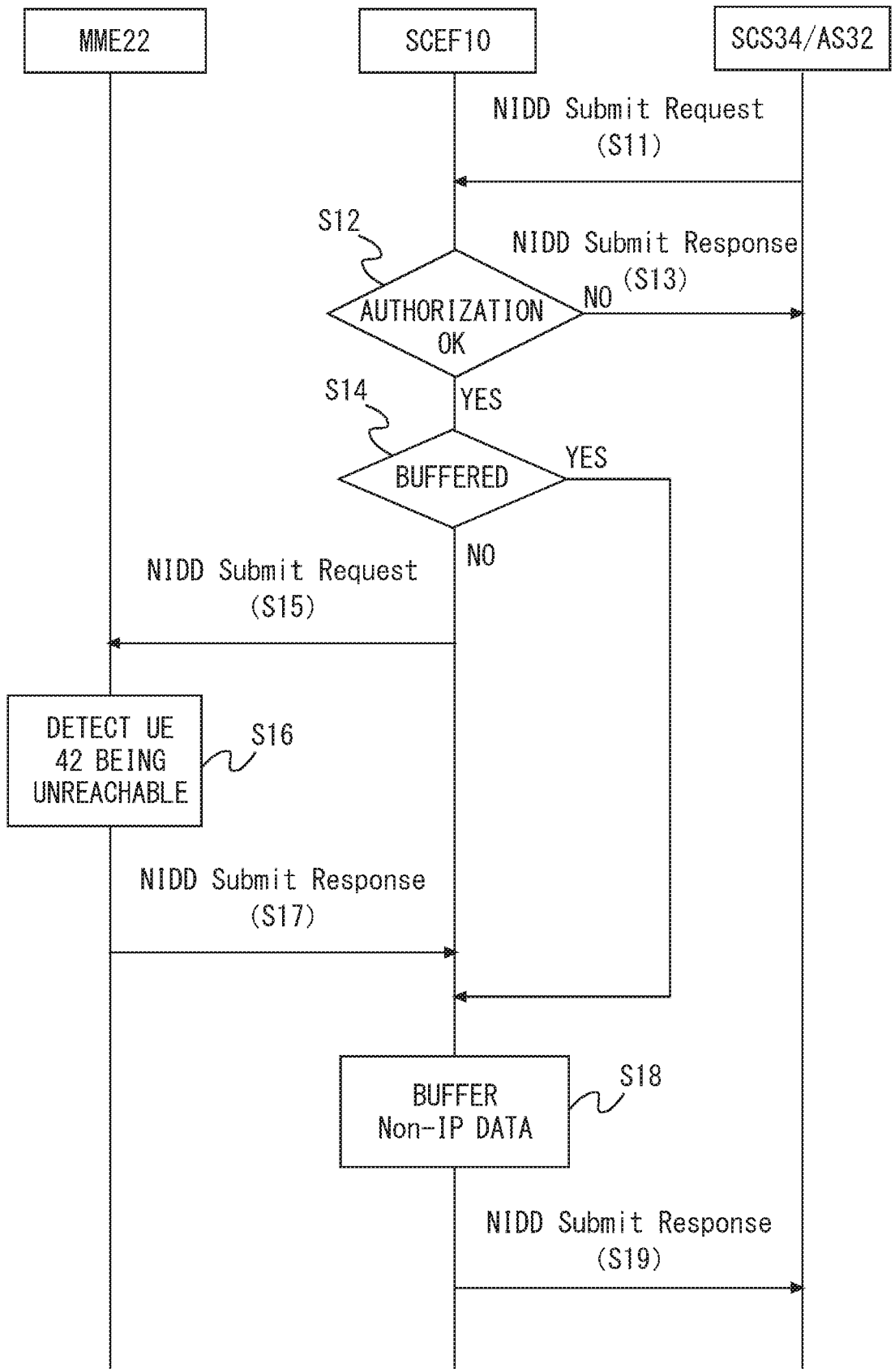
FIG. 3 is a view showing the flow of a process when a UE is unreachable according to the second embodiment.

The MME 22 then transmits an NIDD Submit Indication message to the SCEF 10 that has transmitted the NIDD Submit Response message in Step S17 of FIG. 3 (S22). The NIDD Submit Indication message contains User Identity. The User Identity is identification information of the UE 42.

The SCEF 10 receives the NIDD Submit Indication message from the MME 22, and then transmits the buffered Non-IP data to the MME 22 by using the NIDD Submit Request message (S23). For example, when the SCEF 10 determines that another Non-IP data to be transmitted to the SCEF EPS bearer of the UE 42 is already buffered in the storage unit 11 in Step S14 of FIG. 3, it first transmits the already buffered Non-IP data to the MME 22. After that, the SCEF 10 transmits the Non-IP data received in Step S11 in FIG. 3 to the MME 22.

Further, when the SCEF 10 transmits the Non-IP data to the SCEF EPS bearer of the UE 42 towards the MME 22, it applies quota and rate control so as not to exceed the allowed quota and rate of Non-IP data allowed for the SCS 34/AS 32. Thus, the SCEF 10 applies quota and rate control when transmitting Non-IP data in Step S23 of FIG. 4, in addition to when transmitting Non-IP data to the MME 22 in Step S15 of FIG. 3.

Next, the MME 22 receives the NIDD Submit Request message and then delivers the Non-IP data to the UE 42 (S24). For example, when C-plane connection is established between the UE 42 and the MME 22, the MME 22 immediately transmits the Non-IP data to the UE 42. When, on the other hand, C-plane connection is not established between the UE 42 and the MME 22, the MME 22 performs paging to call the UE 42. After establishing C-plane connection with the UE 42 by paging, the MME 22 transmits the Non-IP data to the UE 42.

Then, when Non-IP data delivery in Step S24 is initiated successfully, the MME 22 transmits an NIDD Submit Response message to the SCEF 10 (S25). The NIDD Submit Response message contains cause value indicating successful initiation of Non-IP data delivery. Further, the SCEF 10 transmits the NIDD Submit Response message received from the MME 22 to the SCS 34/AS 32 (S26).

Further, the operation of Steps S23 to S26 is repeated according to the number of buffered Non-IP data. Specifically, the SCEF 10 transmits an NIDD Submit Request message to the MME 22 for each of the buffered Non-IP data.

Further, when the SCEF 10 transmits Non-IP data to the MME 22 in Step S23, the SCEF 10 may perform quota and rate control so as not to exceed the allowed quota and rate of Non-IP data allowed for the SCEF 10, instead of the allowed quota and rate of Non-IP data allowed for the SCS 34/AS 32.

As described above, the SCEF 10 according to the second embodiment of the present invention can determine whether Non-IP data to be transmitted to the UE 42 is buffered or not. Further, when the SCEF 10 determines that Non-IP data to be transmitted to the UE 42 is buffered, it can buffer Non-IP data without performing the processing of transmitting an NIDD Submit Request message and receiving an NIDD Submit Response message. This prevents the occurrence of unnecessary traffic between the SCEF 10 and the MME 22.

Further, when the SCEF 10 transmits buffered Non-IP data to the SCEF EPS bearer of the UE 42 towards the MME 22, it can transmit previously buffered Non-IP data to the SCEF EPS bearer of the UE 42 towards the MME 22. This prevents the reversal of the order of receiving Non-IP data in the UE 42. It is thereby possible to provide an application service where the order of Non-IP data needs to remain the same.

Further, when the SCEF 10 transmits buffered Non-IP data to the SCEF EPS bearer of the UE 42 towards the MME 22, it can apply quota and rate control so as not to exceed the allowed quota and rate of Non-IP data allowed for the SCS 34/AS 32 or the SCEF 10. This prevents the occurrence of burst transfer when the SCEF 10 re-transmits Non-IP data. It is thereby possible to reduce or prevent the case where the UE 42 such as an IoT device, which is low in performance in terms of communication speed, fails to receive Non-IP data.

Third Embodiment

The flow of a process where the SCEF 10 receives information about allowed quota and rate according to a third embodiment of the present invention is described hereinafter with reference to FIG. 5. In the second embodiment, the SCEF 10 applies quota and rate control so as not to exceed the allowed quota and rate of Non-IP data allowed for the SCS 34/AS 32. In the third embodiment, on the other hand, quota and rate control is applied so as not to exceed the allowed quota and rate of Non-IP data allowed for the UE 42 or the SCEF EPS bearer of the UE 42. The SCEF EPS bearer of the UE 42 is a bearer that is set up between the SCEF 10 and the MME 22 for transmitting Non-IP data between the UE 42 and the SCS 34/AS 32.

First, the SCS 34/AS 32 transmits an NIDD Configuration Request message to the SCEF 10 (S31). The NIDD Configuration Request message contains an External Identifier or MSISDN. The External Identifier or the MSISDN is information that identifies the UE 42. The NIDD Configuration Request message further contains an SCS/AS Reference ID. The SCEF 10 then stores the External Identifier or the MSISDN and the SCS/AS Reference ID contained in the NIDD Configuration Request message into the storage unit 11 (S32).

Then, the SCEF 10 transmits an NIDD Authorization Request message to an HSS (Home Subscriber Server) in order to check whether the SCS 34/AS 32 is authorized to transmit the received NIDD Configuration Request message related to the External Identifier or the MSISDN (S33). The NIDD Authorization Request message contains the External Identifier or the MSISDN and further APN (Access Point Name) associated with the SCEF 10. The HSS is a node device that manages subscriber information related to a plurality of UEs.

Next, the HSS determines that the SCS 34/AS 32 is authorized to transmit the NIDD Configuration Request message (S34). Further, the HSS extracts IMSI (International Mobile Subscriber Identity) associated with the External Identifier or the MSISDN contained in the NIDD Authorization Request message. The IMSI is used as identification information of the UE in the mobile network.

The HSS then transmits an NIDD Authorization Response message to the SCEF 10 as a response to the NIDD Authorization Request message (S35). The NIDD Authorization Response message contains the IMSI associated with the External Identifier or the MSISDN. The NIDD Authorization Response message further contains LoadControlInformation indicating at least one of the allowed quota and rate of Non-IP data allowed for the UE 42. It is assumed that the HSS manages, for each UE, at least one of the allowed quota and rate of Non-IP data allowed for each UE or each SCEF EPS bearer of the UE as subscriber information.

Then, the SCEF 10 transmits an NIDD Configuration Response message to the SCS 34/AS 32 as a response to the NIDD Configuration Request message (S36).

Figure 5:
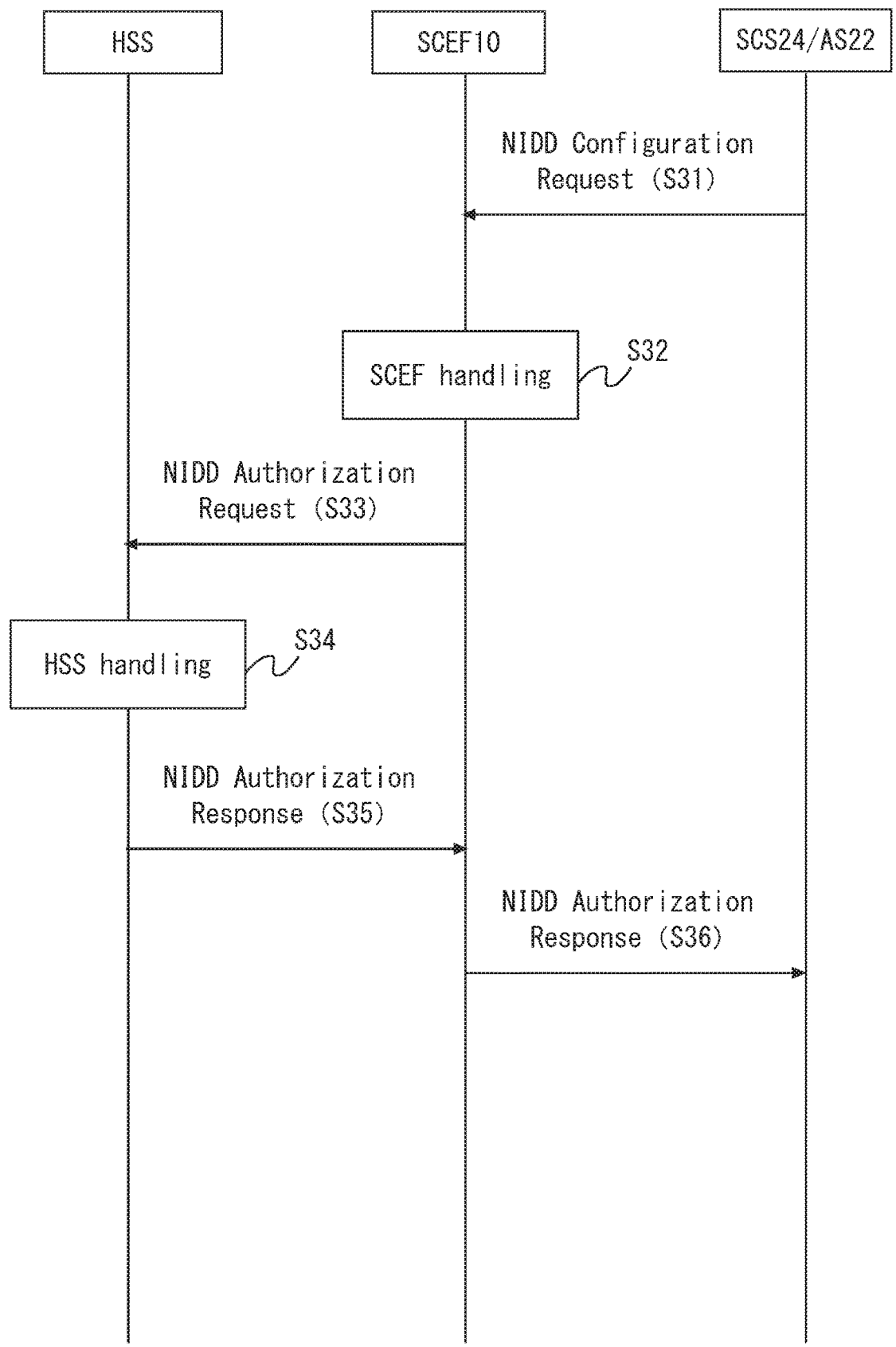
FIG. 5 is a view showing the flow of a process where an SCEF receives information about allowed quota and rate according to a third embodiment.

By performing the process of FIG. 5, the SCEF 10 can acquire, from the HSS, information indicating at least one of the allowed quota and rate of Non-IP data allowed for the UE 42. Alternatively, the SCEF 10 can acquire, from the HSS, information indicating at least one of the allowed quota and rate of Non-IP data allowed for the SCEF EPS bearer of the UE 42.

Figure 4:
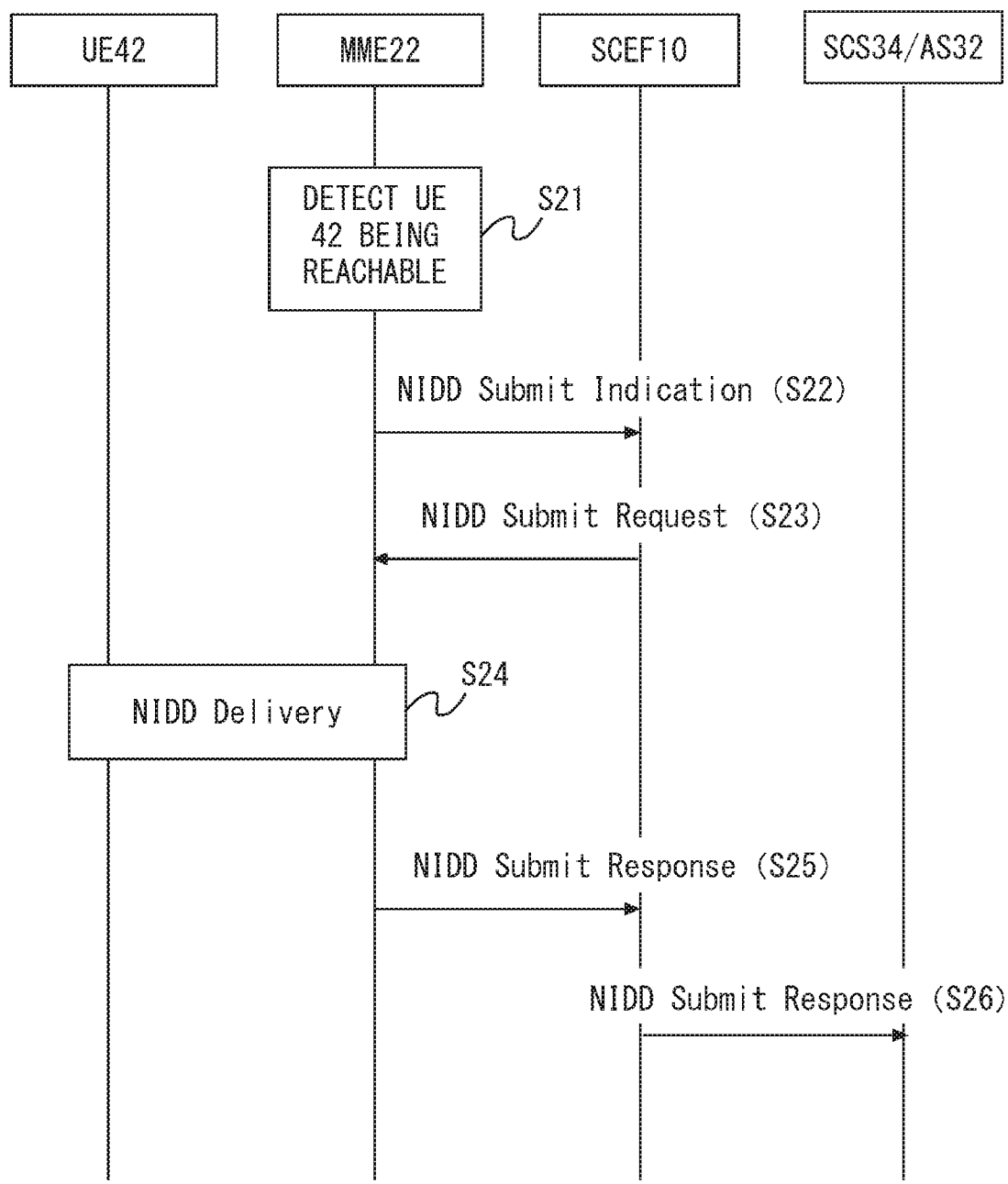
FIG. 4 is a view showing the flow of a process when a UE is unreachable according to the second embodiment.

Further, the SCEF 10 can transmit Non-IP data to the UE 42 according to the same sequence as in FIG. 4. Note that, however, the SCEF 10 applies quota and rate control so as not to exceed the allowed quota and rate of Non-IP data allowed for the UE 42 or the SCEF EPS bearer of the UE 42 when transmitting Non-IP data to the SCEF EPS bearer of the UE 42 towards the MME 22 in Step 15 of FIG. 3 and Step S23 of FIG. 4.

As described above, the SCEF 10 can apply quota and rate control so as not to exceed the allowed quota and rate of Non-IP data allowed for the UE 42 or the SCEF EPS bearer of the UE 42 when transmitting buffered Non-IP data to the SCEF EPS bearer of the UE 42 towards the MME 22. It is thereby possible to reduce or prevent the case where the UE 42 such as an IoT device, which is low in performance in terms of communication speed, fails to receive Non-IP data.

Fourth Embodiment

Figure 6:
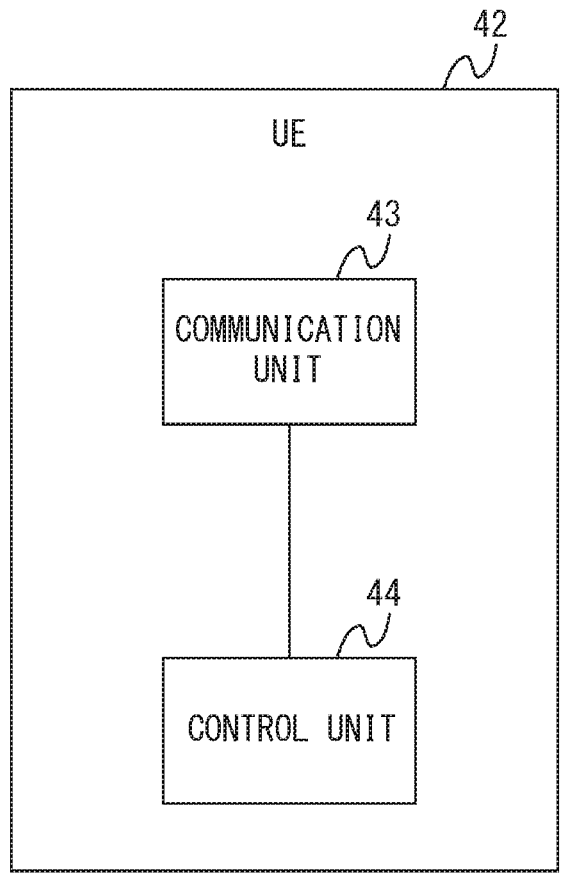
FIG. 6 is a block diagram of a UE according to a fourth embodiment.

A configuration example of a UE 42 according to a fourth embodiment of the present invention is described with reference to FIG. 6. The UE 42 includes a communication unit 43 and a control unit 44. The communication unit 43 and the control unit 44 may be software, a module or the like whose processing is executed by running, on a processor, a program stored in a memory. Alternatively, the communication unit 43 and the control unit 44 may be hardware such as a chip or a circuit.

The communication unit 43 receives Non-IP data delivered from the MME 22. The communication unit 43 receives a plurality of Non-IP data by using one message. Specifically, the MME 22 transmits one message containing a plurality of Non-IP data to the UE 42, rather than repeatedly transmitting Non-IP data the same number of times as the number of Non-IP data buffered in the SCEF 10. The communication unit 43 outputs one message containing a plurality of Non-IP data to the control unit 44.

The control unit 44 reads a plurality of Non-IP data contained in one message for each Non-IP data. In other words, the control unit 44 reads a plurality of Non-IP data contained in one message by isolating them for each Non-IP data. Further, in other words, the control unit 44 parses and reads a plurality of Non-IP data contained in one message.

The control unit 44 may have information about the data size of Non-IP data, for example. For example, in one message containing a plurality of Non-IP data, information about the data size of each of the Non-IP data may be set. Alternatively, in the case where the data size of Non-IP data is predetermined in a mobile network, the control unit 44 may have information about the predetermined data size of Non-IP data. The control unit 44 may read a plurality of Non-IP data contained in one message according to the data size of Non-IP data.

Figure 7:
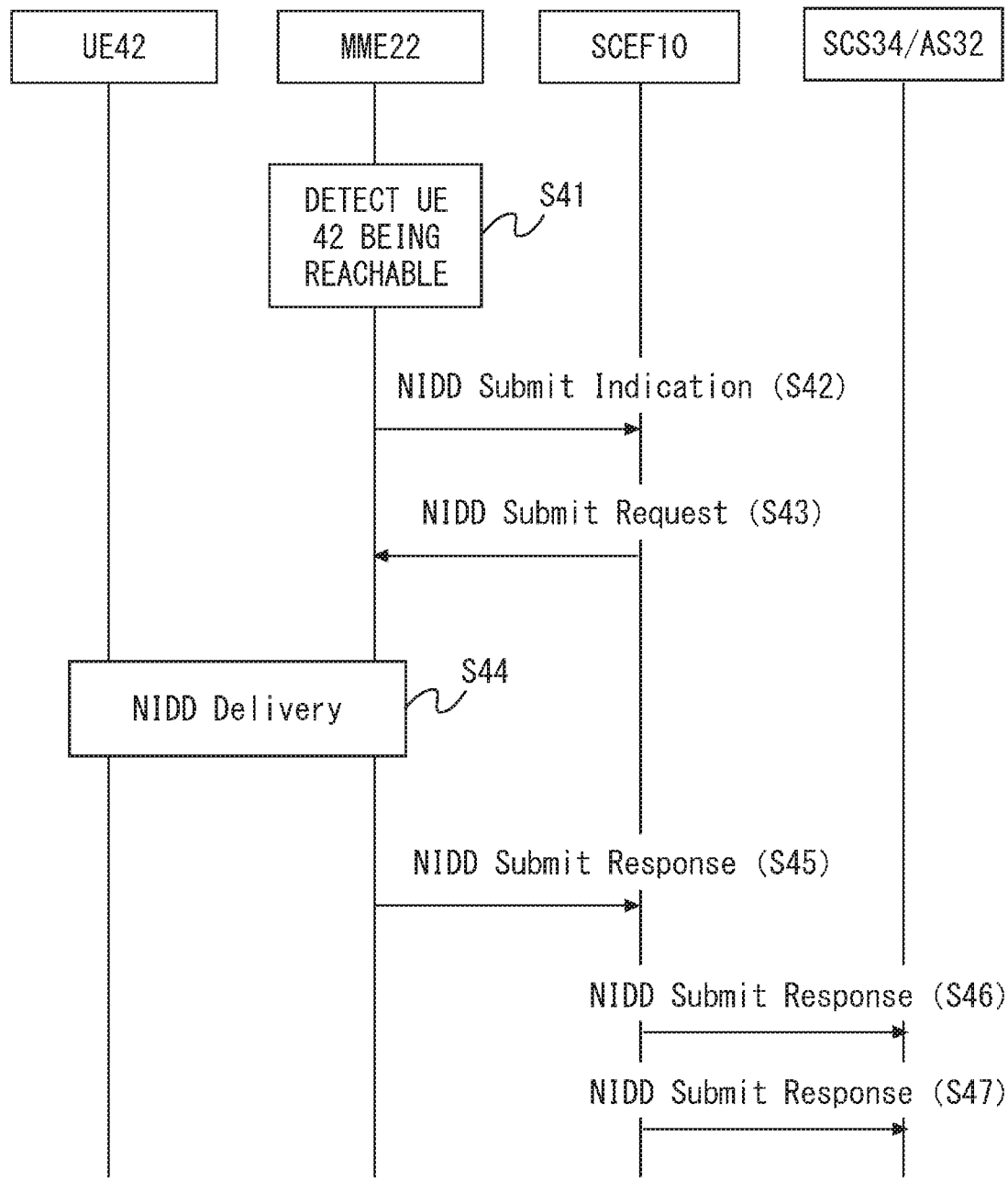
FIG. 7 is a view showing the flow of a process when a UE is reachable according to the fourth embodiment.

The flow of a process when the UE 42 is reachable is described hereinafter with reference to FIG. 7. Steps S41 and S42 in FIG. 7 are the same as Steps S21 and S22 in FIG. 4 and therefore detailed description thereof is omitted.

When the SCEF 10 receives an NIDD Submit Indication message from the MME 22, and then transmits a plurality of buffered Non-IP data to the SCEF EPS bearer of the UE 42 towards the MME 22 by using one NIDD Submit Request message (S43). For example, the SCEF 10 may set initially buffered Non-IP data to a data area close to the beginning of the NIDD Submit Request message and set newly buffered Non-IP data to a data area close to the end of this message.

The MME 22 receives the NIDD Submit Request message containing a plurality of Non-IP data, and then delivers the plurality of Non-IP data to the UE 42 by using one message (S44).

Then, when Non-IP data delivery in Step S44 is initiated successfully, the MME 22 transmits an NIDD Submit Response message to the SCEF 10 (S45). The SCEF 10 then transmits the NIDD Submit Response message to the SCS 34/AS 32 for each Non-IP data (S46 and S47). For example, it is assumed that, in Step S43, the SCEF 10 transmits Non-IP data #1 buffered initially and Non-IP data #2 buffered after that to the MME 22 by using one NIDD Submit Request message. In this case, the SCEF 10 receives the NIDD Submit Response message, and then transmits an NIDD Submit Response message indicating delivery of Non-IP data #1 to the UE 42 in Step S46, and transmits an NIDD Submit Response message indicating delivery of Non-IP data #2 to the UE 42 in Step S47.

As described above, by performing the process shown in FIG. 7, the SCEF 10 can transmit a plurality of Non-IP data to the SCEF EPS bearer of the UE 42 towards the MME 22 by using one NIDD Submit Request message. Further, the MME 22 can deliver a plurality of Non-IP data to the UE 42 by using one message. Furthermore, the UE 42 can read a plurality of Non-IP data contained in one message for each Non-IP data.

This reduces the number of messages transmitted in a mobile network and thereby prevents congestion that can occur in the mobile network. For example, in the case where an IoT terminal is used as the UE 42, a significantly large number of IoT terminals are expected to be connected to a mobile network. Therefore, it is possible to obtain greater effects of reducing the number of messages when an IoT terminal is used as the UE 42, for example.

Fifth Embodiment

Storage of Non-IP data into a buffer according to a fifth embodiment of the present invention is described hereinafter. In some applications, there is a case where, when storing a plurality of Non-IP data into a buffer, Non-IP data already existing in the buffer is not needed, and only Non-IP data newly stored into the buffer is needed.

For example, in the case where Non-IP data is information indicating the state of the UE 42, only new Non-IP data may be needed. To be specific, when the UE 42 is a lamp, Non-IP data may contain information indicating whether to set the lamp state to On or Off. When, after Non-IP data indicating to set the lamp state to On is stored into the buffer, Non-IP data indicating to set the lamp state to Off is transmitted from the SCS 34/AS 32 to the SCEF 10, the Non-IP data initially stored into the buffer is no longer needed.

In such a case, the SCEF 10 may delete the Non-IP data initially stored into the buffer, and buffer only the Non-IP data transmitted from the SCS 34/AS 32 to the SCEF 10 after that.

Non-IP data stored in a buffer is described hereinafter with reference to FIGS. 8 and 9. FIG. 8 shows Non-IP data buffered before transmission in Step S11 of FIG. 3. FIG. 9 shows Non-IP data buffered in Step S18 of FIG. 3.

The order of buffering in FIGS. 8 and 9 indicates that Number 1 is Non-IP data buffered first, and Number 3 is Non-IP data buffered last. The description of setting of Non-IP data may indicate the description of control in the UE 42, for example. For example, the Non-IP data with the buffering order in FIG. 8 of 2 indicates to set the switch of equipment to On. Further, it is assumed that an attribute ID is set to each of the Non-IP data. For example, information indicating the lamp state is set as the attribute ID to the Non-IP data with the buffering order of 2.

When the SCEF 10 receives Non-IP data with the same attribute ID, it may delete the already buffered Non-IP data. FIG. 9 shows that the already buffered Non-IP data is deleted when the attribute IDs of the Non-IP data with the buffering order of 2 and the newly received Non-IP data are the same, i.e., the lamp state.

As described in the foregoing, when buffering Non-IP data, the SCEF 10 can delete Non-IP data that is already buffered and no longer needed. This reduces the buffer size of the SCEF 10.

Configuration examples of the UE 42 and the SCEF 10 described in the above-described plurality of embodiments are described hereinafter.

Figure 10:
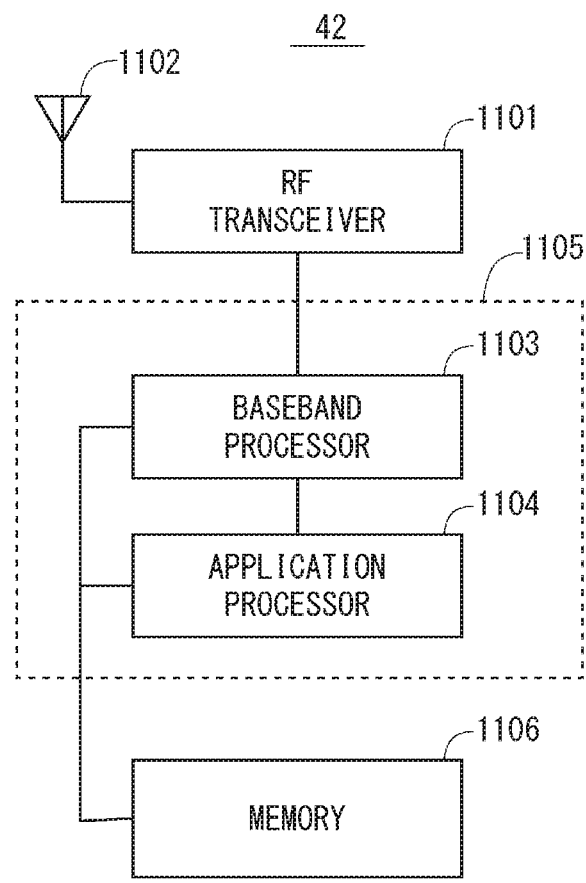
FIG. 10 is a block diagram of a UE according to each embodiment.

FIG. 10 is a block diagram showing a configuration example of the UE 42. A Radio Frequency (RF) transceiver 1101 performs analog RF signal processing for communication with the RAN 26. The analog RF signal processing performed by the RF transceiver 1101 includes frequency up-conversion, frequency down-conversion, and amplification. The RF transceiver 1101 is connected to an antenna 1102 and a baseband processor 1103. Specifically, the RF transceiver 1101 receives modulated symbol data (or OFDM symbol data) from the baseband processor 1103, generates a transmission RF signal and supplies the transmission RF signal to the antenna 1102. Further, the RF transceiver 1101 generates a baseband received signal based on a received RF signal received by the antenna 1102 and supplies it to the baseband processor 1103.

The baseband processor 1103 performs digital baseband signal processing (data plane processing) and control plane processing for radio communication. The digital baseband signal processing includes (a) data compression/decompression, (b) data segmentation/concatenation, (c) transmission format (transmission frame) composition/decomposition, (d) transmission path encoding/decoding, (e) modulation (symbol mapping)/demodulation, and (f) OFDM symbol data (baseband OFDM signal) generation by Inverse Fast Fourier Transform (IFFT) and the like. On the other hand, the control plane processing includes communication management of Layer 1 (e.g., transmission power control), Layer 2 (e.g., radio resource management and hybrid automatic repeat request (HARQ) processing), and Layer 3 (e.g., attach, mobility, and signaling related to call management).

For example, in the case of LTE and LTE-Advanced, the digital baseband signal processing by the baseband processor 1103 may include signal processing of Packet Data Convergence Protocol (PDCP) layer, Radio Link Control (RLC) layer, MAC layer, and PHY layer. Further, the control plane processing by the baseband processor 1103 may include processing of Non-Access Stratum (NAS) protocol, RRC protocol, and MAC CE.

The baseband processor 1103 may include a modem processor (e.g., Digital Signal Processor (DSP)) that performs digital baseband signal processing and a protocol stack processor (e.g., Central Processing Unit (CPU) or Micro Processing Unit (MPU)) that performs control plane processing. In this case, the protocol stack processor that performs control plane processing may be made common to an application processor 1104, which is described below.

The application processor 1104 is also called a CPU, an MPU, a microprocessor or a processor core. The application processor 1104 may include a plurality of processors (a plurality of processor cores). The application processor 1104 implements each function of the UE 42 by running a system software program (Operating System (OS)) and various application programs (e.g., call application, web browser, mailer, camera control application, music playback application etc.) read from a memory 1106 or a memory, which is not shown.

In some implementations, as shown in the dotted line (1105) in FIG. 10, the baseband processor 1103 and the application processor 1104 may be integrated into one chip. In other words, the baseband processor 1103 and the application processor 1104 may be implemented as one System on Chip (SoC) device 1105. The SoC device is also called a system Large Scale Integration (LSI) or a chip set in some cases.

The memory 1106 is a volatile memory, a nonvolatile memory, or a combination of them. The memory 1106 may include a plurality of memory devices that are physically independent of one another. The volatile memory is a Static Random Access Memory (SRAM), a Dynamic RAM (DRAM), or a combination of them, for example. The nonvolatile memory is a mask Read Only Memory (MROM), an Electrically Erasable Programmable ROM (EEPROM), a flash memory, a hard disk drive, or a combination of them, for example. For example, the memory 1106 may include an external memory device that is accessible from the baseband processor 1103, the application processor 1104 and the SoC 1105. The memory 1106 may include an internal memory device that is integrated into the baseband processor 1103, the application processor 1104 or the SoC 1105. Further, the memory 1106 may include a memory in a Universal Integrated Circuit Card (UICC).

The memory 1106 may store a software module (computer program) containing a group of instructions and data for performing the processing by the UE 42 described in the above plurality of embodiments. In several implementations, the baseband processor 1103 or the application processor 1104 may be configured to perform the processing of the UE 42 described in the above embodiments by reading the software module from the memory 1106 and executing it.

Figure 11:
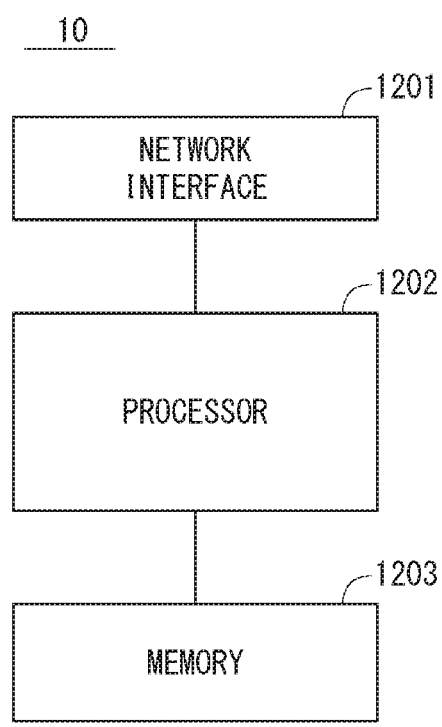
FIG. 11 is a block diagram of an SCEF according to each embodiment.

FIG. 11 is a block diagram showing a configuration example of the SCEF 10. Referring to FIG. 11, the SCEF 10 includes a network interface 1201, a processor 1202, and a memory 1203. The network interface 1201 is used to communicate with network nodes (e.g., the MME 22 or the SGSN 24). The network interface 1201 may include a network interface card (NIC) that complies with the IEEE 802.3 series, for example.

The processor 1202 reads and runs software (computer program) from the memory 1203 and thereby executes processing of the SCEF 10 that is described with reference to the sequence charts and the flowcharts in the embodiments described above. The processor 1202 may be a microprocessor, an MPU or a CPU, for example. The processor 1202 may include a plurality of processors.

The memory 1203 is a combination of a volatile memory and a nonvolatile memory. The memory 1203 may include a storage that is placed apart from the processor 1202. In this case, the processor 1202 may access the memory 1203 through an I/O interface, which is not shown.

In the example of FIG. 11, the memory 1203 is used to store a group of software modules. The processor 1202 reads and runs the group of software modules from the memory 1203 and can thereby perform the processing of the SCEF 10 described in the above embodiments.

As described with reference to FIGS. 10 and 11, each of processors included in the UE 42 and the SCEF 10 in the above embodiments runs one or a plurality of programs including a group of instructions for causing a computer to perform the algorithms described using the drawings. This program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, DVD-ROM (Digital Versatile Disc Read Only Memory), DVD-R (DVD Recordable)), DVD-R DL (DVD-R Dual Layer)), DVD-RW (DVD ReWritable)), DVD-RAM), DVD+R), DVR+R DL), DVD+RW), BD-R (Blu-ray (registered trademark) Disc Recordable)), BD-RE (Blu-ray (registered trademark) Disc Rewritable)), BD-ROM), and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

It should be noted that the present invention is not limited to the above-described embodiments and may be varied in many ways within the scope of the present invention. Further, in this disclosure, embodiments can be combined as appropriate.

While the invention has been particularly shown and described with reference to embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2016-199093 filed on Oct. 7, 2016, the disclosure of which is incorporated herein in its entirety by reference.

Further, the whole or part of the embodiments disclosed above can be described as, but not limited to, the following supplementary notes.

Supplementary Note 1

An SCEF entity comprising:

a storage unit configured to buffer first Non-IP data not delivered to a communication terminal; and a control unit configured to, when the first Non-IP data is buffered upon receiving second Non-IP data addressed to the communication terminal from a server device, suppress transmission of the second Non-IP data to a control device in a mobile network and buffer the second Non-IP data into the storage unit.

Supplementary Note 2

The SCEF entity according to Supplementary Note 1, wherein the control unit determines whether the first Non-IP data is buffered or not upon receiving the second Non-IP data from the server device, and buffers the second Non-IP data into the storage unit when it determines that the first Non-IP data is buffered, and transmits the second Non-IP data to the control device when it determines that the first Non-IP data is not buffered.

Supplementary Note 3

The SCEF entity according to Supplementary Note 1 or 2, wherein upon receiving a message indicating that Non-IP data is deliverable to the communication terminal from the control device, the control unit transmits the first and second Non-IP data buffered into the storage unit to the control device.

Supplementary Note 4

The SCEF entity according to Supplementary Note 3, wherein the control unit transmits, to the control device, Non-IP data buffered into the storage unit in the order in which the Non-IP data have been buffered into the storage means.

Supplementary Note 5

The SCEF entity according to Supplementary Note 3 or 4, wherein the control unit transmits, to the control device, one message containing a plurality of Non-IP data buffered into the storage unit.

Supplementary Note 6

The SCEF entity according to any one of Supplementary Notes 3 to 5, wherein the control unit transmits the first and second Non-IP data to the control device so as to satisfy quota or rate allowed for the server device.

Supplementary Note 7

The SCEF entity according to any one of Supplementary Notes 1 to 6, wherein when quota or rate allowed for the server device is exceeded upon receiving the second Non-IP data addressed to the communication terminal from the server device, the control unit discards the second Non-IP data.

Supplementary Note 8

The SCEF entity according to any one of Supplementary Notes 3 to 5, wherein the control unit transmits the first and second Non-IP data to the control device so as to satisfy quota or rate allowed for the communication terminal or a communication bearer for transmitting Non-IP data to the communication terminal.

Supplementary Note 9

The SCEF entity according to any one of Supplementary Notes 1 to 8, wherein when quota or rate allowed for the communication terminal or a communication bearer for transmitting Non-IP data to the communication terminal is exceeded upon receiving the second Non-IP data addressed to the communication terminal from the server device, the control unit discards the second Non-IP data.

Supplementary Note 10

The SCEF entity according to Supplementary Note 8 or 9, wherein the control unit receives information related to quota or rate allowed for the communication terminal or the communication bearer for transmitting Non-IP data to the communication terminal from a subscriber information management device placed in the mobile network.

Supplementary Note 11

The SCEF entity according to any one of Supplementary Notes 3 to 5, wherein the control unit transmits the first and second Non-IP data to the control device so as to satisfy quota or rate allowed for the SCEF entity.

Supplementary Note 12

The SCEF entity according to any one of Supplementary Notes 1 to 11, wherein when quota or rate allowed for the SCEF entity is exceeded upon receiving the second Non-IP data addressed to the communication terminal from the server device, the control unit discards the second Non-IP data.

Supplementary Note 13

The SCEF entity according to any one of Supplementary Notes 1 to 12, wherein when the second Non-IP data is Non-IP data for updating the first Non-IP data indicating a state of the communication terminal, the control unit deletes the first Non-IP data from the storage unit and buffers the second Non-IP data into the storage unit.

Supplementary Note 14

A communication terminal comprising:

a communication unit configured to, upon the communication terminal becoming reachable, receive a plurality of Non-IP data buffered in an SCEF entity until the communication terminal becomes reachable as one message through a control device; and a control unit configured to read the plurality of Non-IP data contained in the one message for each Non-IP data.

Supplementary Note 15

A data processing method comprising:

buffering first Non-IP data not delivered to a communication terminal; and when the first Non-IP data is buffered upon receiving second Non-IP data addressed to the communication terminal from a server device, suppressing transmission of the second Non-IP data to a control device in a mobile network and buffering the second Non-IP data into the storage unit.

Supplementary Note 16

A data receiving method comprising:

upon a communication terminal becoming reachable, receiving a plurality of Non-IP data buffered in an SCEF entity until the communication terminal becomes reachable as one message through a control device; and reading the plurality of Non-IP data contained in the one message for each Non-IP data.

Supplementary Note 17

A program causing a computer to execute:

buffering first Non-IP data not delivered to a communication terminal; and when the first Non-IP data is buffered upon receiving second Non-IP data addressed to the communication terminal from a server device, suppressing transmission of the second Non-IP data to a control device in a mobile network and buffering the second Non-IP data into the storage unit.

Supplementary Note 18

A program causing a computer to execute:

upon a communication terminal becoming reachable, receiving a plurality of Non-IP data buffered in an SCEF entity until the communication terminal becomes reachable as one message through a control device; and reading the plurality of Non-IP data contained in the one message for each Non-IP data.

REFERENCE SIGNS LIST

10 SCEF
11 STORAGE UNIT
12 CONTROL UNIT
20 CONTROL DEVICE
22 MME
24 SGSN
26 RAN
30 SERVER DEVICE
32 AS
34 SCS
40 COMMUNICATION TERMINAL
42 UE
43 COMMUNICATION UNIT
44 CONTROL UNIT

The invention claimed is:

1. An exposure function entity comprising a processor configured to process to:
receive a request for NIDD (Non-IP Data Delivery) including downlink non-IP data from a server;
buffer the downlink non-IP data;
buffer additional downlink non-IP data, without sending a request for NIDD including the additional downlink non-IP data toward a control device before a terminal becomes reachable or is about to be reachable, if receiving an additional request for NIDD including the additional downlink non-IP data from the server while already buffering downlink non-IP data; and
purge downlink non-IP data buffered in the exposure function entity corresponding to the additional downlink non-IP data.

2. The exposure function entity according to claim 1, wherein
the exposure function entity is a SCEF (Service Capability Exposure Function) entity;
the server is a SCS/AS (Service Capability Server/Application Server); and
the control device is a MME (Mobility Management Entity) or a SGSN (Serving GPRS (General Packet Radio Service) Support Node).

3. A method comprising:
receiving a request for NIDD (Non-IP Data Delivery) including downlink non-IP data from a server;
buffering the downlink non-IP data;
buffering additional downlink non-IP data, without sending a request for NIDD including the additional downlink non-IP data toward a control device before a terminal becomes reachable or is about to be reachable, if receiving an additional request for NIDD including the additional downlink non-IP data from the server while already buffering downlink non-IP data; and
purging buffered downlink non-IP data corresponding to the additional downlink non-IP data.

4. The method according to claim 3, wherein
the server is a SCS/AS (Service Capability Server/Application Server); and
the control device is a MME (Mobility Management Entity) or a SGSN (Serving GPRS (General Packet Radio Service) Support Node).

* * * * *